(12) United States Patent
Tan

(10) Patent No.: US 8,797,067 B1
(45) Date of Patent: Aug. 5, 2014

(54) DETECTION OF SIGNALS FOR TRANSMISSION

(71) Applicant: Maxim Integrated Products, Inc., San Jose, CA (US)

(72) Inventor: Mehmet Ali Tan, Irvine, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 13/730,636

(22) Filed: Dec. 28, 2012

(51) Int. Cl.
*G01R 23/02* (2006.01)

(52) U.S. Cl.
USPC .................................. 327/47; 327/48; 327/49

(58) Field of Classification Search
USPC ............................................. 327/47–49, 308
See application file for complete search history.

(56) References Cited

U.S. PATENT DOCUMENTS

| | | | | |
|---|---|---|---|---|
| 4,101,849 A | * | 7/1978 | Blackmer et al. | 333/14 |
| 4,538,297 A | * | 8/1985 | Waller, Jr. | 381/106 |
| 4,700,361 A | * | 10/1987 | Todd et al. | 375/244 |
| 7,046,750 B1 | * | 5/2006 | Vierthaler et al. | 375/345 |
| 7,397,873 B2 | * | 7/2008 | Vierthaler et al. | 375/345 |

* cited by examiner

*Primary Examiner* — Kenneth B. Wells
(74) *Attorney, Agent, or Firm* — TIPS Group

(57) ABSTRACT

A circuit, set forth by way of example and not limitation, includes a signal detector operative to detect two types of signals, where the two types of signals include a higher-frequency signal and a lower-frequency signal. The signal detector is operative to detect that a received input signal is one of the two types of signals. An output driver is operative to receive the input signal and to adjust conditioning performed on the input signal to create an output signal for transmission over a communication channel, where the adjustment is based on the detection by the signal detector.

18 Claims, 3 Drawing Sheets

DETECTION OF SIGNALS FOR TRANSMISSION

BACKGROUND

Then are many electronic applications for which data needs to be transmitted at high speeds over hand-limited channels. For example, data storage systems, servers, data communication systems, and digital media systems all need to provide high-speed serial links over band-limited channels. This can be accomplished by providing a transmitter at one end and a receiver at the other end of a "telecommunications channel" or "communication link" and sending or receiving signals over the channel using a communication interface.

Digital communication interfaces are used in a number of applications for electronic devices, and include standard communication specifications such as Universal Serial Bus (USB), Serial Advanced Technology Attachment (SATA), Firewire, etc. USB, for example, is a commonly-used device interface standard that allows data communication between a host and one or more peripheral devices. USB 3.0, for example, provides greater bandwidth over previous versions of that interface and full-duplex communication. However, the high-speed data signals used in more recent standards such as USB 3.0 may also introduce noise and jitter due to signal attenuation, causing undesirable signal voltage swing and degraded signal quality.

One way to reduce signal quality degradation is to use redrivers and/or repeaters in a communication system. A redriver receives a transmitted signal and conditions it to reduce the effects of noise, crosstalk, inter-symbol interference (ISI), and other undesirable signal degradation from transmission, and then sends the conditioned signal to the receiver over a communication link. Redrivers can allow the use of extended transmission channels that have lengths larger than allowed by the requirements of the communication specification, including longer circuit board traces and/or longer transmission cables.

One way that redrivers and other transmission devices can condition signals for transmission is by applying "emphasis" to the signal to be transmitted, including pre-emphasis and/or de-emphasis. The signal-to-noise ratio (SNR) of the transmitted signal can be improved by increasing or decreasing the magnitude of particular frequencies in the signal. For example, in some data transmission implementations, noise occurring in the transmission channel can reduce the amplitude of higher-frequency components of a transmitted signal, especially in channels of longer length. De-emphasis can be used at the transmitter to reduce the amplitude of lower-frequency components of the signal so as to achieve uniform amplitude of all components of the signal at the receiver, thus reducing the effects of noise on the transmitted signal. However, emphasis techniques may cause undesired effects for signals in some transmission applications.

These and other limitations of the prior art will become apparent to those of skill in the art upon a reading of the following descriptions and a study of the several figures of the drawing.

SUMMARY

A circuit, set forth by way of example and not limitation, includes a signal detector operative to detect two types of signals, where the two types of signals include a higher-frequency signal and a lower-frequency signal. The signal detector is operative to detect that a received input signal is one of the two types of signals. An output driver is operative to receive the input signal and to adjust conditioning performed on the input signal to create an output signal for transmission over a communication channel, where the adjustment is based on the detection by the signal detector.

In some implementations, the higher-frequency signal is a data signal and the lower-frequency signal is a control signal. The conditioning can include signal de-emphasis, and adjusting the conditioning can include deactivating the signal de-emphasis if the lower-frequency signal was detected and activating the signal de-emphasis if the higher-frequency signal was detected. Various implementations can include an electrical idle detector, retriggerable monostable, latch, and/or state machine. In some implementations, the signal detector and output driver can be provided in a redriver system that outputs the output signal over the communication channel.

A signal detector, set forth by way of example and not limitation, includes an electrical idle detector coupled to an input and operative to detect an input signal on the input. A circuit is coupled to the input and to the electrical idle detector, where the circuit is operative to detect two types of signals including a control signal and a data signal. The circuit is operative to detect that the input signal on the input is one of the two types of signals. The circuit provides a detector signal used to indicate the type of signal of the input signal to an output driver for use in adjusting conditioning performed on the input signal for output over a communication channel. In some implementations, the control signal is a lower-frequency signal and the data signal is a higher-frequency signal, and adjusting the conditioning includes deactivating signal de-emphasis if the lower-frequency control signal is detected by the circuit and activating signal de-emphasis if the higher-frequency data signal is detected by the circuit.

A method for providing adaptive equalization for a signal, set forth by way of example and not limitation, includes receiving an input signal at a signal detector operative to detect two types of signals, where the two types of signals includes a higher-frequency signal and a lower-frequency signal. The method includes determining that the input signal is one of the two types of signals, and adjusting conditioning performed on the input signal based on the detected type of signal to create an output signal for transmission on a communication channel. In some implementations, the higher-frequency signal can be a data signal and the lower-frequency signal can be a control signal. The conditioning can include signal de-emphasis, and adjusting the conditioning can include deactivating the signal de-emphasis if the lower-frequency signal is detected and activating the signal de-emphasis if the higher-frequency signal is detected.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTION OF EXAMPLE IMPLEMENTATIONS

Figure 1:
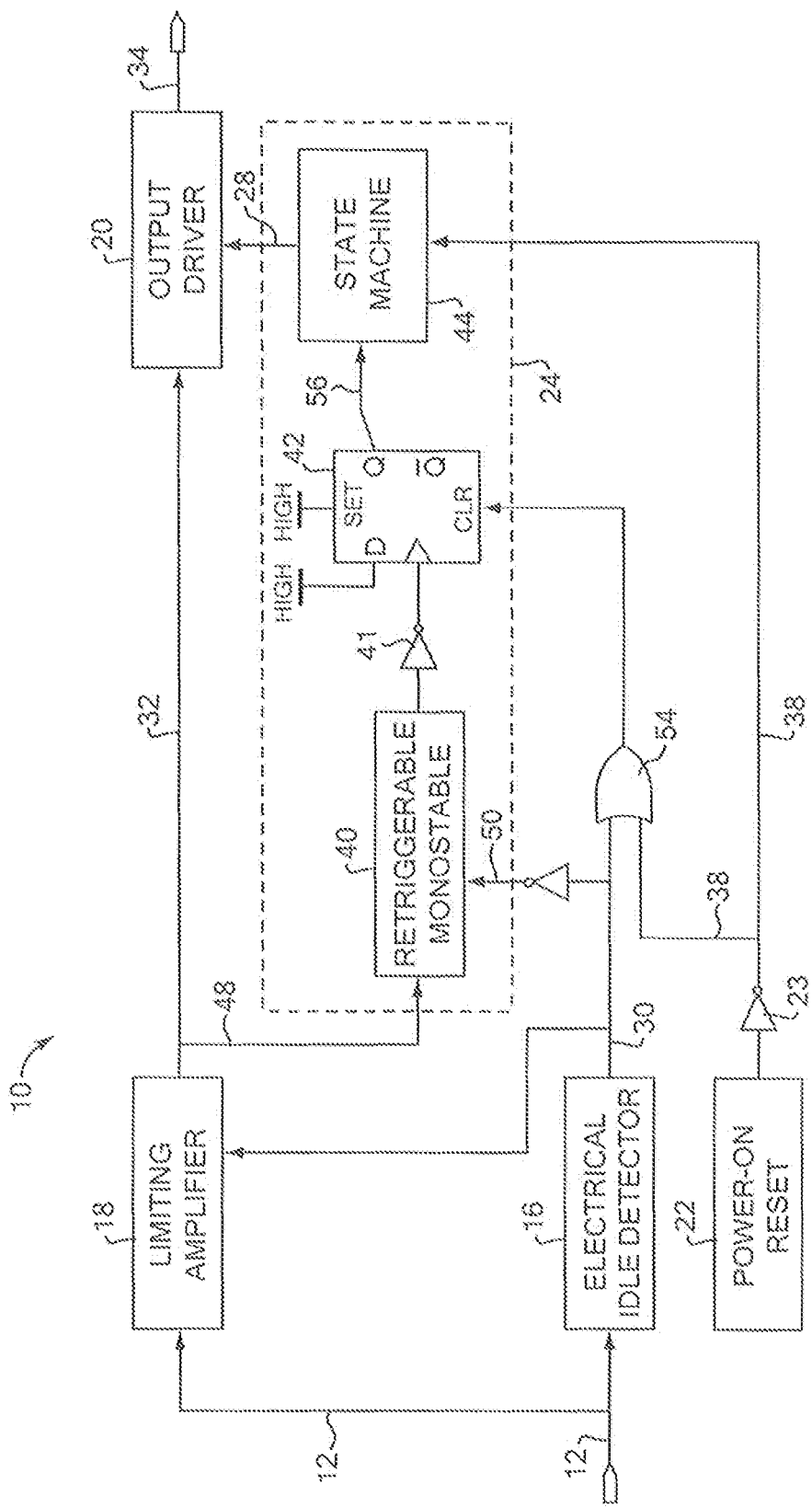
FIG. 1 is a block diagram of an example driver system suitable for use with one or more features and implementations described herein.

In the following descriptions, components will be discussed with reference to specific examples such as particular frequency ranges, particular communication standards, etc. These examples are not to be seen as limiting but, rather, illustrative of the general concepts set forth herein.

Implementations described herein provide features for detecting signals for signal transmission over a channel to a receiver and, based on a detected type of an input signal, adjusting the conditioning performed on that signal by an output driver. The signal types can include lower-frequency signals and higher-frequency signals, and/or the types can include data signals and control signals. For example, some implementations detect lower-frequency control signals and higher-frequency data signals used in high-speed communication protocols such as USB 3.0. In some implementations, the conditioning performed by the output driver can include emphasis which is enabled for the higher-frequency signals and is disabled for the lower-frequency signals. This allows the lower-frequency signals to be transmitted without being distorted by conditioning and/or undetected by the receiver.

One or more features described herein can, in some implementations, be used in transmission devices such as redrivers and repeaters. These devices can be used to allow extended lengths of communication channels such as circuit-board traces and/or transmission cables beyond standard lengths specified in a communication standard. Longer transmission channel lengths as well as other channel characteristics may cause greater distortion to higher-frequency transmitted signals. For example, higher-frequency content in a signal may become more attenuated than lower-frequency content, resulting in large deterministic jitter caused by inter-symbol interference (ISI) and other forms of jitter. ISI is a form of signal distortion wherein a transmitted symbol interferes with subsequent transmitted symbols and may introduce errors at the receiver.

These transmission devices can perform signal conditioning on a signal to reduce the effects of distortion caused by transmission. The conditioning can include emphasis, which is a form of pre-distortion of the signal to compensate for distortion incurred during transmission such that a signal of the intended form is received at the receiver. For example, emphasis can help preserve the ratio of higher-frequency component amplitude to lower-frequency component amplitude within the original signal. However, emphasis may have undesired effects in some implementations. For example, some communication standards use lower-frequency signals as control signals. Herein, the term "control signals" refer to types of non-data signals used for commands or interface functionality, and in some implementations can include initial handshaking and/or negotiation signals sent between transmitter and receiver to establish a connection as well as any other commands or other non-data signals sent over a transmission channel to a receiver. For example, in some non-limiting examples, the USB 3.0 communication standard uses lower-frequency signals (e.g., 10-50 MHz) known as Low Frequency Periodic Signals (LFPS) as control signals for the initial handshaking to establish a connection between a transmitter and a receiver, and uses higher-frequency data signals (e.g., about 500 MHz to 2.5 GHz) to transmit data.

Conditioning of higher-frequency signals, such as applying emphasis to signals, assists in reducing the effects of distortion and maintaining signal integrity for transmission. However, lower frequency signals may be distorted by such conditioning. Lower-frequency do not need the conditioning since they are not subject to as many losses or distortion by transmission. For example, an LFPS signal in the USB 3.0 standard can be reduced in amplitude by de-emphasis applied at an output driver, which may cause a receiver to not detect the LFPS signal if the amplitude has been reduced. Features described herein allow selective signal conditioning such as emphasis to be applied only to types of signals benefiting from such conditioning. For example, such emphasis can be applied to high-frequency signals to reduce transmission distortion in those signals, but lower-frequency signals can be transmitted without applying such conditioning to prevent distortion of the lower-frequency signals.

FIG. 1 is a block diagram of an example driver system 10 suitable for use with one or more features and implementations described herein. Driver system 10 can in some implementations be included on an integrated circuit chip in an electronic device, which can be implemented in any of various forms, such as an IC chip, an application-specific integrated circuit (ASIC), field programmable gate array (FPGA), or other processors or circuits. Portions of the system 10 can also be implemented using logic gates and/or one or more state machines.

Driver system 10 can be included in any of a wide variety of communication systems. In general, driver system 10 is coupled to a physical or wireless communication link in a communication system, and sends signals on the communication link from one or more transmitting components of the communication system that are connected to the communication channel, to one or more receiving components at the other end of the channel. Driver system 10 can be included in any suitable electronic device. For example, the system 10 can be included in a redriver or repeater device used to condition and/or boost signals provided from an electronic device for transmission over a channel. The redriver signals repeater device can be included in or coupled to any type of electronic device. In some examples, the electronic device can take the form of a server, desktop computer, storage device, laptop computer, portable device, cell phone, tablet, personal digital assistant (PDA), e-book reader, peripheral device, video game console, set top box, television device, appliance, or various other forms of electronic devices.

For example, driver system 10 can be provided in a redriver that is coupled between a transmitter and a receiver to transmit signals received from the transmitter to maintain signal amplitude and/or power over longer channel distances compared to transmissions having no redriver use. The redriver can apply various signal conditioning such as equalization and emphasis including, pre-emphasis and/or de-emphasis. In one example, the redriver can be provided in an electronic device and receive a data signal. The redriver performs de-emphasis to the data signal as appropriate and provides the signal over a communication channel to a receiver at the other end of the link. The redriver can also be a system physically separated from transmitter and receiver and connected via the communication channel.

Driver system 10 receives signals on an input signal line 12, which is connected to the communication channel receiving data from one or more transmitters. In some implementations, the input line 12 can be provided by a standardized communication interface that communicates data over communication channels between electronic devices using a standardized protocol. In some examples, a standard communication interlace such as Universal Serial Bus (USB) can be used. For example, some implementations herein can be used with the USB 3.0 standard providing higher-speed communication than previous versions of USB. In a USB implementation, for example, the input signal received on line 12 can be a differential signal. In other implementations, features described herein can be used with other communication standards for the communication link, such as Serial Advanced Technology Attachment (SATA), eSATA (external SATA), PCIE (Peripheral Component Interconnect Express), Firewire, etc.

Driver system 10 includes an electrical idle detector block 16, a limiting amplifier 18, an output driver block 20, a power-on reset block 22, and a signal detector block 24.

The electrical idle detector block 16 receives the input signal on line 12. This block 16 can detect whether an input signal received on the line 12 is a viable, intended signal for transmission by the transmission system (including driver system 10), or whether the received signal is noise that is not considered to be an intended signal and should be ignored. In some implementations, the electrical idle detector block 16 can check the input signal by examining an amplitude of the input signal and comparing the amplitude to a predetermined threshold amplitude. If the input signal is below the threshold, then the electrical idle detector block 16 can consider the signal to be noise and ignore it. In some non-limiting examples using a USB interface and signals, a signal threshold can be about 100 mV peak-to-peak, such that if the input signal is less than that threshold, the electrical idle detector block 16 can assume that the signal is not meaningful and ignore it.

The electrical idle detector block 16 can output a signal 30 indicative of its detection of the input signal at line 12. In sonic implementations, for example, the output signal 30 can be a binary signal indicating whether a viable signal has been input. Signal 30 can be output to the limiting amplifier 18 as a control signal to enable the signal path of the driver system 10, as described below.

Limiting amplifier 18 is coupled to the input line 12 and receives the input signal on the line 12. The amplifier 18 can be used in some implementations to suppress amplitude variations in high frequency input signals and to provide gain for weak voltage signals. In some implementations, the operation of the limiting amplifier can be controlled by the electrical idle detector block 16. In some examples, if the electrical idle detector block 16 detects only noise and no viable signal at the input line 12, it sends a signal on line 30 to the limiting amplifier 18 corresponding with that detection. Upon receiving the signal indicating the lack of a viable input signal, the limiting amplifier shuts down the signal path of the input signal on line 12 through the amplifier. If the electrical idle detector block 16 detects a viable input signal at line 12, the block 16 can send a signal on line 30 that causes the limiting amplifier to perform its normal operation by receiving the input signal on line 12 and outputting amplified signal on line 32.

Output driver 20 receives the input signal on line 32 from the limiting amplifier and converts the signal to an output signal having a form suitable for transmission over a communication channel 34. For example, in some implementations, the output driver can receive signals from the limiting amplifier 18 and convert the signals to a form suitable for a USB communication channel. In some implementations, the output driver 20 provides emphasis to the input signal to condition the signal for transmission, in some implementations, the emphasis can alter the amplitude of particular frequency components of the signal. For example, de-emphasis can be applied to lower-frequency components of a high frequency data signal. This reduces the amplitude of the lower-frequency components With respect to the higher-frequency components as a way of pre-distorting the signal to reduce its susceptibility to noise as seen by the receiver. In some examples, the transmission of a high frequency signal over the channel may cause inter-symbol interference (ISI) and/or other jitter to be induced in the signal. By reducing the amplitude of lower-frequency components in the signal, the higher-frequency components of the signal are emphasized. Since the higher-frequency components are typically more affected and attenuated by ISI, jitter, and noise than the lower-frequency components during transmission, the conditioned signal is received at the receiver with approximately similar amplitudes of higher-frequency content and lower-frequency content.

In some implementations, pre-emphasis can be performed by the output driver, in which higher-frequency components are increased in amplitude. Some implementations can perform equalization of the signal for further conditioning and compensation for attenuation of the signal from transmission.

The output driver receives an enable signal 28 from the low frequency detector block 24. The enable signal is used to turn on and off the signal emphasis performed on the signal to be transmitted. For example, the enable signal 28 can disable or override a de-emphasis function of the output driver. This is described in greater detail below.

Power-on reset block 22 can be included in driver system 10 to provide a reset signal on a line 38 for one or more components in the low frequency detector block 24. In some examples, a state machine in the block 24 can use the reset signal to initialize states of the state machine and a latch in block 24 can use the reset signal to provide a clearing of the latch. The reset block 22 can provide a reset signal upon power-on of the driver system 10 and/or of the electronic device in which the driver system is included or to which it is connected. In some implementations, an inverter 23 can be used to invert the output of block 22 appropriately for some components.

The signal detector block 24 can be used to detect different types of input signals received on the input line 12. In some implementations, the block 24 detects whether a viable input signal is one of two types: a lower-frequency signal such as a low frequency control signal, or a higher-frequency signal such as a high frequency data signal. This detection is used to control one or more functions of the output driver 20. In some implementations, detector block 24 can include a retriggerable monostable 40, a latch 42, and a state machine 44.

Retriggerable monostable 40 can be a circuit such as a monostable multivibrator or one-shot. Upon receiving an input signal edge or pulse, the monostable can switch to an unstable state for a period of time based on properties of the monostable such as resistance and capacitance, and provide a corresponding output. The monostable then returns to a stable state (resets) having a corresponding output. In some implementations, the monostable is retriggerable since it can maintain the unstable state if an input signal pulse transition is repeatedly received during that state. A time constant of the monostable 40 adds a duration after receiving an input signal and before the monostable outputs a triggered output. In some implementations, the retriggerable monostable 40 can be implemented to receive a differential input signal.

In some example implementations of FIG. 1, the retriggerable monostable 40 receives the amplified input signal on line

48 as the input signal that triggers the unstable state. The monostable 40 also receives an enable signal 50 from the electrical idle detector 16, which enables and disables the monostable 40 from triggering based on the state of the signal 50. Operation of the monostable 40 is described in greater detail below with respect to FIGS. 2 and 3. The output of the monostable block 40 can inverted with an inverter 41 in some implementations.

Latch 42 is coupled to the retriggerable monostable 40 and can be used to latch the output of the monostable 40. In some implementations, the latch 42 can be a D flip flop having a clock input connected to the output of the retriggerable monostable 40, a D input and SET input connected to a high voltage level, and an output connected to the Q output. The output of the latch can be a detection signal 56 that indicates the type of the input signal. In some implementations, the OR input of latch 42 is connected to the output of an OR gate 54. The OR gate 54 has as inputs the output of the electrical idle detector 16 and the power-on reset block 22, such that the OR gate output provides an active signal either when a viable input signal is detected by the electrical idle detector 16 or when the power-on-reset block 22 provides a reset signal. This OR gate output is used to clear the latch 42. Operation of the latch 42 is described in greater detail below with respect to FIGS. 2 and 3.

State machine block 44 has an input coupled to the detector signal 56 output of the latch 42. The state machine block can, for example, be included in the block 44 as shown in FIG. 1 or can be provided separately from the signal detection block 44. State machine 44 is used to determine which type of signal is currently being input to the driver system 10 based on the detection signal from the latch, and to control one or more functions of the output driver 20 based on the type of input signal. In some implementations, the state machine 44 provides enable signal 28 for enabling an emphasis function of the output driver 20 if the input signal on line 12 is a high frequency data signal, and for disabling or overriding the emphasis function of the output driver if the input signal is a low frequency control signal. In some implementations, the state machine 44 can also shut down other blocks in the driver system 10 when they are not needed. The state machine 44 receives the reset signal 38 from the power-on reset block 22 which resets states of the state machine upon power-up or reset of the driver system 10 and/or electronic device. One example of a method that can be implemented by the state machine block 44 is described in greater detail below with respect to FIG. 4. Other implementations can use other logic and/or circuits instead of or in addition to a state machine.

Figure 2:
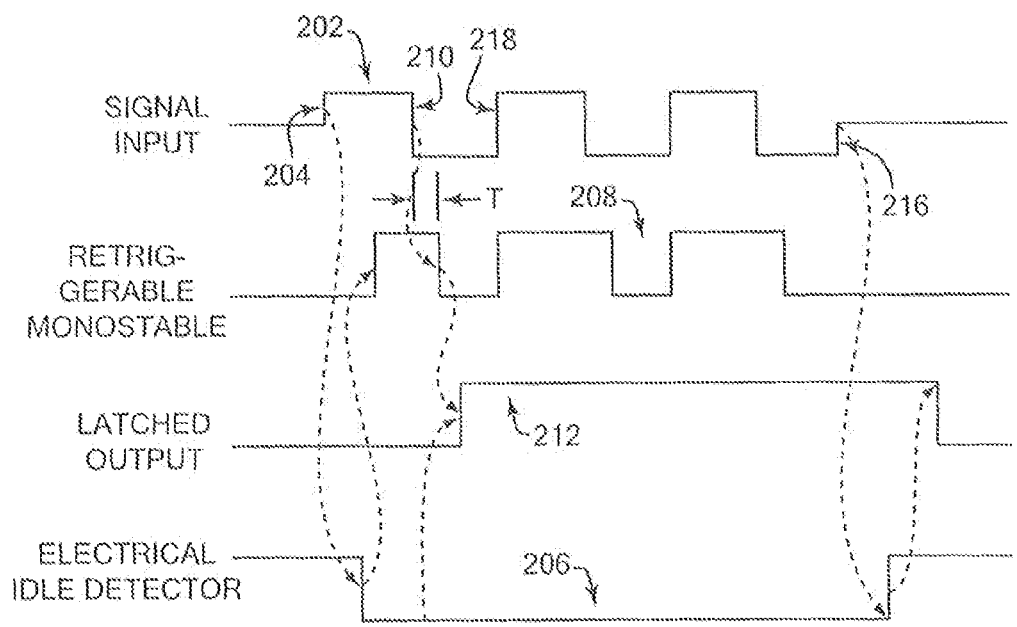
FIG. 2 is a diagrammatic illustration of signals that can be used in some implementations of the driver system of FIG. 1 in response to receiving a lower frequency type of signal as an input signal.

FIG. 2 is a diagrammatic illustration of an example of several signals that can be used in some implementations of the driver system 10 of FIG. 1 in response to receiving a lower-frequency type of signal as an input signal. An example of signals used when receiving a higher-frequency type of signal are described below with reference to FIG. 3. The described low and high states of signals is used only for explanation and different signal states can be used in other implementations.

An input signal 202 is provided and can be output from the limiting amplifier 18 in the example of FIG. 1. In this example, the input signal 202 moves to positive and negative amplitudes from a middle zero level. Signal 202 is a lower-frequency signal with wider pulses than higher-frequency signals also received at the input. For example, the lower-frequency signal 202 can be a control signal. In some non-limiting examples, the signal 202 can be an LFPS signal used in the USB 3.0 specification, which can have an alternating "1010" pattern and has a frequency that generally ranges from about 10 to 50 MHz and the shortest input pulse is about 10 nanoseconds (e.g., a half cycle of the pattern at 50 MHz).

The first rising edge 204 of the input signal 202 is detected by the electrical idle detector block 16 and is sufficiently high in amplitude to pass as a viable input signal. Thus, the output signal 206 of the electrical idle detector block 16 goes low in this implementation. The low state of the electrical idle detector signal 206 is sent to the retriggerable monostable 40 and enables the monostable. The rising edge 204 of the input signal 202 along with the enable signal 206 causes the retriggerable monostable 40 to trigger and its output signal 208 goes high.

The next falling edge 210 of the input signal 202 triggers the output 208 of the retriggerable monostable 40 to go low after a time constant T of the monostable. This time constant thus adds a delay of time period T before the monostable output responds to the input signal 202. The combination of the low state of the monostable output 208 and the low state of the electrical idle detector signal 206 causes the detection signal 212 output from the latch 42 to go high. The high state of the latch detection signal 212 indicates that the input signal has been detected as a lower-frequency signal such as a control signal in some implementations. The latch output signal 212 stays high as long as the electrical idle detector signal 206 stays low.

At a later edge 216, the input signal 212 goes back to the zero level, indicating that there is no longer an input signal at the input line 12. The electrical idle detector block 16 detects this lack of signal and changes its output signal 206 to high to indicate that there is no longer a viable input signal. In response to the electrical idle detector signal 206 going high, the latch output signal 212 goes low, indicating here that there is no longer a low frequency signal being input to the driver system 10. In some implementations such as USB 3.0, a data signal that follows the initial low frequency control signal will not appear for a known minimum time period, such that the latch can be released within that time period.

Thus when a signal of sufficiently low frequency, such as signal 212, is input to the system, the signal detector block 44 detects that such a signal has been input. This is due to the retriggerable monostable 40 that goes low after the falling edge 210 of the input signal 212. If, however, the input signal 212 has a high enough frequency that causes a succeeding edge (such as rising edge 218) to occur before the time period T of the monostable 40 has passed, then this next edge will be detected by the monostable 40 and will keep its output signal 208 high. If the output signal 208 stays high, the latch signal 212 will stay low and no low frequency signal is detected.

To allow the signal detector block 44 to detect a signal as a low frequency signal, that signal can have a sufficiently low frequency to cause its shortest pulse duration to be larger than the time period T. In other words, the retriggerable monostable 40 can have a time constant that causes the time period T to be less than the shortest pulse width of a signal desired to be detected as a low frequency signal. In some non-limiting examples, the low frequency input signal can be a control signal such as an LFPS signal, which may have a shortest pulse width of about 10 nanoseconds. Thus, to detect the LFPS signal, the retriggerable monostable 40 can have a time constant that causes the time period T to be less than 10 nanoseconds. Furthermore, the time period T can be made greater than the longest pulse width of any signal desired to be considered as a high frequency signal so that the high frequency signal is not detected by block 44, as described below.

Figure 3:
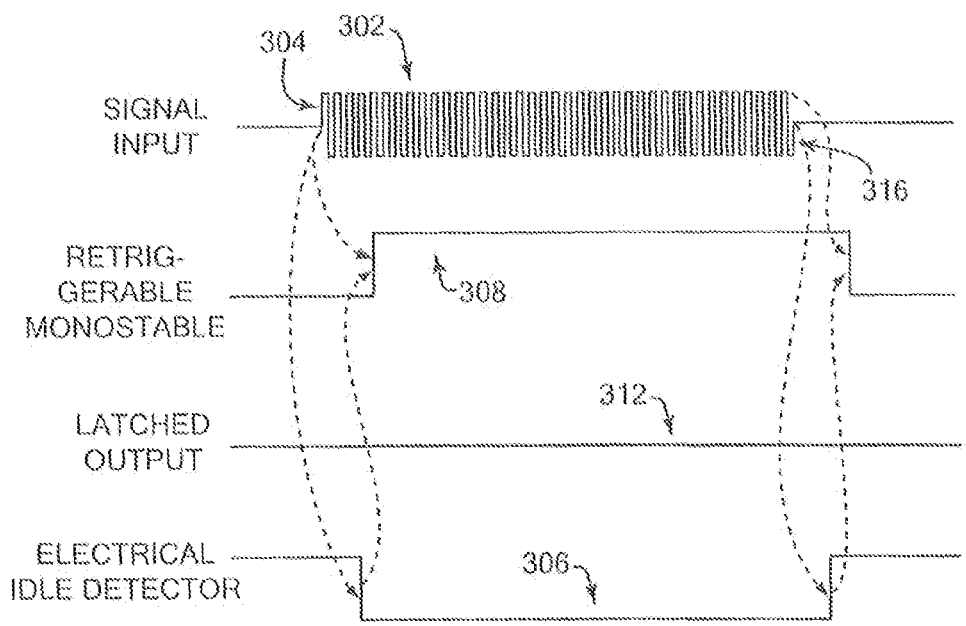
FIG. 3 is a diagrammatic illustration of signals that can be used in some implementations of the driver system of FIG. 1 in response to receiving a higher frequency type of signal as an input signal.

FIG. 3 is a diagrammatic illustration of several signals that can be used in some implementations of the driver system 10 in response to receiving a higher-frequency type of signal as an input signal.

An input signal 302 is provided and can be output from the limiting amplifier 18 in the example of FIG. 1. In this example, the input signal 302 moves to positive and negative amplitudes from a middle zero level. As shown, signal 302 is a higher-frequency signal with narrower pulses than the lower-frequency signal 202 of FIG. 2. For example, the higher-frequency signal 302 can be a data signal. In some non-limiting examples, the signal 302 can be a data signal used in the USB 3.0 specification, which has a minimum frequency of about 500 MHz, which corresponds to a maximum pulse width of about 1 ns.

The first rising edge 304 of the input signal 302 is detected by the electrical idle detector block 16 and is sufficiently high in amplitude to pass as a viable input signal. Thus, the output signal 306 of the electrical idle detector block 16 goes low in this implementation. The low state of the electrical idle detector signal 306 is sent to the retriggerable monostable 40 and enables the monostable. The rising edge 304 of the input signal 302 along with the enable signal 306 causes the retriggerable monostable 40 to trigger and its output signal 308 goes high.

The next falling and rising edges of the input signal 302 occur much more quickly than in the lower-frequency input signal 202 of FIG. 2. The successive edges of the input signal 302 occur before the time period T of the monostable has elapsed, thus causing the output of the monostable to remain high and to never fall back to the low state. Since the monostable signal 308 stays high, the detection signal 312 output from latch 42 stays low and never goes high. The low stale of the detection signal 312 indicates that the received input signal is not detected as a low frequency signal and therefore is a high frequency signal. The detection signal 312 stays low during the remaining duration that the input signal 302 is input.

At a later edge 316, the input signal 302 goes back to the zero level, indicating that there is no longer an input signal at the input line 12. The electrical idle detector block 16 detects this lack of signal and changes its output signal 306 to high to indicate that there is no longer a viable input signal. In response to the electrical idle detector signal 306 being high, and since there no additional full edges being provided on the input signal 312, the monostable output signal 308 goes back to low after the time period T, indicating that there is no longer a high frequency signal being input to the driver system 10.

Thus when a signal of sufficiently high frequency, such as signal 312, is input to the system, the signal detector block 44 does not detect that such a signal is a low frequency signal. This is due to the retriggerable monostable 40 that outputs a signal that stays high during the input of the input signal 312.

To allow the signal detector block 44 to avoid detecting a signal as a high frequency signal, the time period T can be made greater than the longest pulse width of the higher-frequency signal. In some non-limiting examples, the higher-frequency input signal can be a data signal in the USB 3.0 standard, which has a frequency of about 2.5 GHz and has limitations in the amount of consecutive 0s and 1s in the signal (e.g., because of encoding such as 10b/8b encoding). For example, to avoid detecting the USB 3.0 data signal, the retriggerable monostable 40 can have a time constant that causes the time period T to be greater than about 1 nanosecond.

Figure 4:
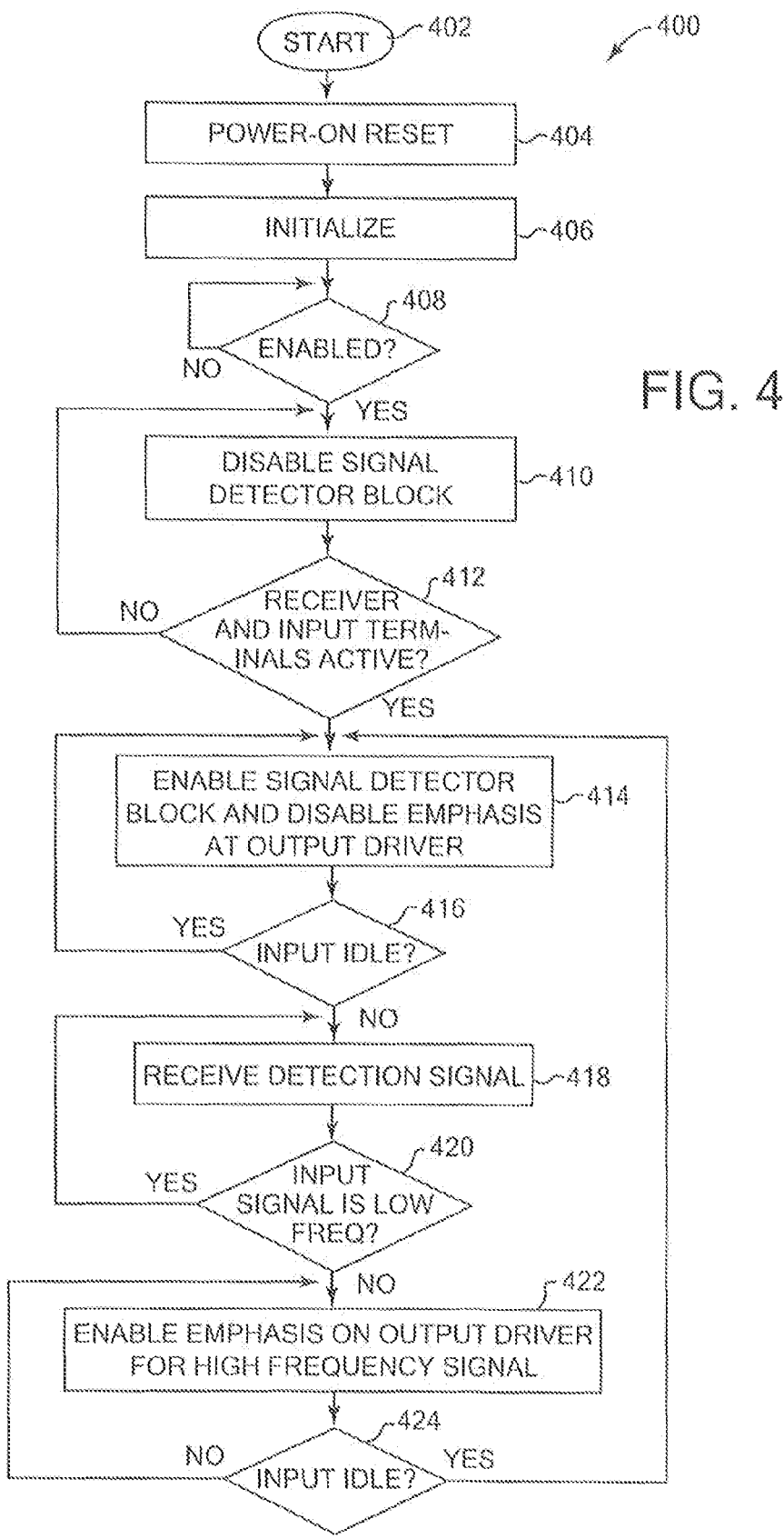
FIG. 4 is a flow diagram illustrating an example method that can implement signal detection according to one or more features described herein.

FIG. 4 is a flow diagram illustrating an example method 400 that can implement signal detection according to one or more features described herein. Method 400 can be implemented using software, hardware, or a combination of software and hardware elements. For example, in some implementations, the method 400 can be performed by a processor or processing circuitry, such as the state machine block 44 as shown in FIG. 1 and/or other processor, logic or circuitry. Other or additional components can perform the method 400 in other implementations. A software embodiment can include but is not limited to firmware, resident software, microcode, etc. Furthermore, some implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk.

The method begins at 402, and a power-on reset can be performed in step 404. In some systems, a power-on reset may occur on one or more integrated circuits that include the driver system 10, such as upon a power-up or reset of the system or particular system components, or upon a new detection of a device or cable connected to the system 10. An initialize step 406 can provide a standard sequence of events after power up, such as setting all variables (such as memory locations or registers) to an initial state for the process. In some implementations such as the implementation of FIG. 1, the power-on reset block 22 can provide a reset signal to other components of the driver system 10, such as the latch 42 and the state machine 44 that uses initial values for state variables, In step 408, the process checks whether the driver system has been enabled. In some implementations, an electronic device may include the driver system 10 and can enable the system during periods when communication is to be performed and disable the system during times when communication is not being performed or is not likely to be performed. Such disabling of the driver system 10 can, for example, conserve power consumption in some implementations. If the driver system is not enabled, then the process continues to check whether it is enabled. Once the driver system is enabled, the process continues to step 410, in which the signal detector block 44 is disabled. This initial disabling can be performed in some implementations to first ensure that the appropriate connections are established for transmission.

In step 412, the process checks whether a receiver is connected to the output driver of the driver system, and further checks whether the input terminals are activated and ready to provide input signals to be transmitted. If both of these are not ready, then the process returns to step 410 to continue to disable the signal detector block 44. Once a receiver is connected and input terminals are activated, the process continues to step 414.

In step 414, the process enables the signal detector block 44 and disables the emphasis settings applied at the output driver. In some implementations, this enabling allows the state machine block 44 to respond to the detection signal 212 output by the latch 42, and the state machine block 44 provides an enable signal to the output driver 20 that disables the emphasis (such as de-emphasis) provided to input signals sent to the output driver for transmission. This disabling of the emphasis settings can be performed in implementations in which low frequency control signals are typically transmitted over the channel before high frequency data signals are transmitted. For example, in some implementations such as USB 3.0 devices, low frequency control signals that are detected by the signal detection block 44 include LFPS control signals that are sent in initial handshaking and negotiation functions between transmitter and receiver before data signals are transmitted. The initial enablement of the low frequency signal detection and override of the emphasis settings allows such initial handshaking control signals to be transmitted soon after initialization of the driver system.

In step 416, the process checks whether the input is idle. For example, if the electrical idle detector block 16 does not detect any viable input signal on the input line 12, the input is electrically idle. If so, the process returns to step 414 to maintain the operation of the signal detector block 44 and emphasis disable. If the input line is not idle, then a viable input signal has been received on the input line as detected by the electrical idle detector block 16, and The process continues to step 418. In step 418, the process receives a detection signal indicating whether the input signal is a low frequency signal or a high frequency signal. For example, in an implementation of FIG. 1, the state machine block 44 can receive the detection signal 212 from the latch 42 indicating whether the input signal is a low frequency control signal such as an UPS signal, or a high frequency data signal.

In step 420, the process checks whether the input signal is a low frequency signal. For example, this can be a check as to whether the input signal is a low frequency control signal, such as an LFPS-type signal in the USB 3.0 standard. The type of signal is determined based on the detection signal provided by the signal detector block 44. If the input signal is a low frequency signal, then the process returns to step 418 to continue to receive the detection signal and to maintain the emphasis disable at the output driver 20 as established previously in step 414. If the input signal is not a qualifying low frequency signal, then it is a high frequency signal, such as the high frequency data signal used in the USB 3.0 standard, and the process continues to step 422.

In step 422, the emphasis function of the output driver is enabled for transmitting the high frequency signal. For example, in some implementations, the state machine block 44 provides a signal to the output driver 20 to release a de-emphasis setting on the output driver, allowing de-emphasis to be applied to the high frequency data signal as desired to reduce noise and/or jitter effects on the signal as received by the receiver. The process then continues to step 424 to check whether the input is idle. For example, if the electrical idle detector block 16 does not detect any viable input signal on the input line 12, the input is idle. If not idle, then a viable input signal continues to be received on the input line, and the process returns to step 420 to continue applying the emphasis on the output for the high frequency signal. If the input is detected as idle, the process returns to step 414 to enable the signal detection block 44 and disable the emphasis at the output driver.

By returning to step 414 and disabling the emphasis after an idle input is detected in step 424, the process assumes that the current signal transmission has ended and that the next transmission will again start with low frequency signals similarly as after initialization. In some implementations, the detected idle state in step 424 may only be a very short period and high frequency data signal may continue to be input for transmission. In such implementations, the process can instead return to step 418 to receive the detection signal from the detector block 44, e.g., where the emphasis setting of the output driver is not overridden. Some implementations can return to step 418 from step 424 if the idle period is under a predetermined threshold, and can return to step 414 if the idle period is over the threshold.

It should be noted that the order of steps or operations described in FIG. 4 is only one example, and that different orders can be used in other implementations, and/or some steps or operations performed simultaneously.

Implementations other than those described above can be used to detect whether an input signal is a low frequency signal or a high frequency signal and, based on the detection, disable an emphasis function for transmitted low frequency signals. For example, in some implementations, filters can be used. In some examples, the input signal can be split into two parallel branches, where one branch includes a lowpass analog filter for filtering high frequency signals and the other branch includes a highpass analog filter for filtering low frequency signals. The type of signal is detected based on which branch allows the input signal to pass through. If the low frequency signal is detected, the emphasis function of the output driver is disabled, and if the high frequency signal is detected, then the emphasis settings of the output driver are enabled. For example, in some implementations the power of both the highpass and the lowpass filter outputs can be detected and compared. If the highpass filter output power is higher than the lowpass filter output, then the signal is a higher frequency signal. Such filters can be analog filters made from capacitors and resistors. In one non-limiting example suitable for USB 3.0 embodiments, the passbands of these filters can have a gap and be around 160 MHz.

If analog filters are used, such filters can be positioned in the transmission path before the limiting amplifier 18 modifies or alters the signal so that the signal is carrying all the levels of information to allow more accurate filtering and linear response from the filters. For example, in some implementations the filters can be positioned in transmission components prior to the driver system 10. Since such filtering can cause more power dissipation in the signal and the high frequency components may be further attenuated when reaching the output driver, additional amplification may also be needed in some implementations, which can add further noise or distortion to the signal. Such filters may require larger circuit area to implement than the implementations of FIG. 1.

Other implementations can use the features described herein. For example, other implementations can provide other types of signals besides data and/or control signals that are, for example, lower frequency and higher frequency (or have other distinguishable characteristics) and which can be detected and or used to control transmission conditioning and/or output by utilizing one or more described features. In other implementations, features described herein can be used by a receiver providing signal conditioning to received signals.

Although various implementations have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other implementations may be interchanged either in whole or in part. It is therefore intended that the claims be interpreted in accordance with the true spirit and scope of the inventions without limitation or estoppel.

What is claimed is:

1. A circuit comprising:
a signal detector operative to detect two types of signals, wherein the two types of signals include a higher-frequency signal and a lower-frequency signal, and wherein the signal detector is operative to detect that a received input signal is one of the two types of signals; and
an output driver operative to receive the input signal and to adjust conditioning performed on the input signal to create an output signal for transmission over a communication channel, wherein the adjustment is based on the detection by the signal detector;
wherein the signal detector includes a retriggerable monostable block that is triggered by the received input signal.

2. The circuit of claim 1 wherein the higher-frequency signal is a data signal and the lower-frequency signal is a control signal.

3. The circuit of claim 1 wherein the conditioning performed on the input signal includes adjusting an amplitude of at least some portions of the input signal.

4. The circuit of claim 1 wherein the conditioning includes signal de-emphasis, and wherein adjusting the conditioning includes deactivating the signal de-emphasis if the lower-frequency signal was detected and activating the signal de-emphasis if the higher-frequency signal was detected.

5. The circuit of claim 4 wherein the signal de-emphasis lowers an amplitude only of a set of lower-frequency components of the higher-frequency signal and not of a set of higher-frequency components of the higher-frequency signal.

6. The circuit of claim 1 wherein the retriggerable monostable block is operative to reset if a signal transition is not received within a predetermined period of time.

7. The circuit of claim 1 wherein the retriggerable monostable block is operative to reset if the input signal has a pulse width over a predetermined length.

8. The circuit of claim 1 wherein the signal detector includes a latch that latches the output of the retriggerable monostable if the retriggerable monostable resets and provides a detector signal as the output of the latch.

9. The circuit of claim 8 wherein the signal detector includes a state machine receiving the output of the latch and providing an enable signal to the output driver.

10. The circuit of claim 1 further comprising an electrical idle detector operative to determine if the received input signal is a viable input signal for transmission and is not noise, wherein the electrical idle detector provides an enable signal to the retriggerable monostable.

11. The circuit of claim 1 wherein the signal detector and output driver are provided in a redriver system that outputs the output signal over the communication channel.

12. The circuit of claim 2 wherein the lower-frequency control signal is a low frequency periodic signal (LFPS) used in the Universal Serial Bus (USB) 3.0 standard, and wherein a use of the lower-frequency signal includes initial negotiation between a transmitter and a receiver connected to the communication channel.

13. A signal detector comprising:
an electrical idle detector coupled to an input and operative to detect an input signal on the input; and
a circuit coupled to the input and to the electrical idle detector, the circuit operative to detect two types of signals, wherein the two types of signals include a control signal and a data signal, and wherein the circuit is operative to detect that the input signal on the input is one of the two types of signals,
wherein the circuit provides a detector signal used to indicate the type of signal of the input signal to an output driver for use in adjusting conditioning performed on the input signal for output over a communication channel.

14. The signal detector of claim 13 wherein the control signal is a lower-frequency signal and the data signal is a higher-frequency signal, wherein the conditioning includes signal de-emphasis for reducing signal distortion caused by transmission of the input signal over the communication channel, and wherein adjusting the conditioning includes deactivating the signal de-emphasis if the lower-frequency control signal is detected by the circuit and activating the signal de-emphasis if the higher-frequency data signal is detected by the circuit.

15. A method comprising:
receiving an input signal at a signal detector operative to detect two types of signals, wherein the two types of signals includes a higher-frequency signal and a lower-frequency signal;
determining that the input signal is one of the two types of signals; and
adjusting conditioning performed on the input signal based on the detected type of signal to create an output signal for transmission on a communication channel;
wherein the higher-frequency signal is a data signal and the lower-frequency signal is a control signal.

16. The method of claim 15 wherein the conditioning includes signal de-emphasis for reducing signal distortion caused by transmission of the input signal over the communication channel.

17. The method of claim 16 wherein adjusting the conditioning includes deactivating the signal de-emphasis if the lower-frequency control signal is detected by the circuit and activating the signal de-emphasis if the higher-frequency data signal is detected by the circuit.

18. The method of claim 15 wherein the lower-frequency control signal is a low frequency periodic signal (LFPS) used in the Universal Serial Bus (USB) 3.0 standard, and wherein a use of the lower-frequency signal includes initial negotiation between a transmitter and a receiver connected to the communication channel.

* * * * *